United States Patent
Silverman et al.

(10) Patent No.: US 12,231,987 B2
(45) Date of Patent: Feb. 18, 2025

(54) RSSI LOCATION TRACKING VIA RADIO SCANNING FOR TRIGGERED OFDMA UPLINK

(71) Applicant: CISCO TECHNOLOGY, INC., San Jose, CA (US)

(72) Inventors: Matthew Aaron Silverman, Shaker Heights, OH (US); John Matthew Swartz, Lithia, FL (US); Ardalan Alizadeh, Milpitas, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 17/555,598

(22) Filed: Dec. 20, 2021

(65) Prior Publication Data
US 2023/0199432 A1 Jun. 22, 2023

(51) Int. Cl.
*H04W 4/029* (2018.01)
*H04B 17/318* (2015.01)
*H04W 84/12* (2009.01)

(52) U.S. Cl.
CPC .......... *H04W 4/029* (2018.02); *H04B 17/318* (2015.01); *H04W 84/12* (2013.01)

(58) Field of Classification Search
CPC .............................. H04W 4/029; H04B 17/318
USPC ........................................................ 455/456.1
See application file for complete search history.

(56) References Cited

U.S. PATENT DOCUMENTS

| | | | |
|---|---|---|---|
| 9,749,786 B1 | 8/2017 | Pandey et al. | |
| 2015/0215762 A1* | 7/2015 | Edge | H04W 8/005 370/338 |
| 2016/0044504 A1* | 2/2016 | Edge | H04W 4/029 455/456.3 |
| 2017/0332385 A1 | 11/2017 | Shirali | |
| 2018/0324741 A1 | 11/2018 | Sharma | |

(Continued)

FOREIGN PATENT DOCUMENTS

| EP | 3890216 A2 | 10/2021 |
|---|---|---|
| WO | WO2018125355 A1 | 7/2018 |

OTHER PUBLICATIONS

The PCT Search Report and Written Opinion mailed Mar. 20, 2023 for PCT application No. PCT/US2022/053359, 17 pages.

(Continued)

*Primary Examiner* — Ted M Wang
(74) *Attorney, Agent, or Firm* — Lee & Hayes, P.C.

(57) ABSTRACT

This technology allows for determining the location of client devices via radio scanning for triggered orthogonal frequency-division multiple access ("OFDMA") uplinks. Access points ("APs") are configured for OFDMA transmissions. A first AP transmits a trigger frame on particular channel to stations in the wireless network. Neighboring APs scan channels for trigger frames ("TF"). Upon detection of a TF, neighboring APs associate a station identifier with a frequency allocation, or resource unit, in the TF. The neighboring APs receive an OFDMA uplink from the stations, determine a received signal strength indicator ("RSSI") value for each frequency allocation in the OFDMA uplink, and transmit the RSSI values with the associated station identifier to the first AP. The first AP determines the location of each station by mapping a distance value to the RSSI values.

20 Claims, 8 Drawing Sheets

(56) References Cited

U.S. PATENT DOCUMENTS

| | | |
|---|---|---|
| 2019/0159162 A1 | 5/2019 | Hassan |
| 2020/0107282 A1 | 4/2020 | Segev |
| 2020/0177340 A1 | 6/2020 | Gupta |
| 2020/0374810 A1 | 11/2020 | Hart |
| 2023/0152471 A1* | 5/2023 | Nekoui ............... H04W 12/108 |
| | | 342/357.64 |

OTHER PUBLICATIONS

Lee, "Using OFDMA for MU-MIMO User Selection in 802.11ax-Based Wi-Fi Networks", IEEE Access, Dec. 18, 2019, 15.

Procyk, "Design & Deployment Outdoor Wireless Networks", Cisco Live!, Jan. 28, 2021, 214.

Vanevenhoven, "A New Way to Add Indoor Location Context", Aruba—Blogs, Oct. 19, 2020, 5.

* cited by examiner

RSSI LOCATION TRACKING VIA RADIO SCANNING FOR TRIGGERED OFDMA UPLINK

TECHNICAL FIELD

This disclosure relates to determining the location of client devices via radio scanning for triggered orthogonal frequency-division multiple access ("OFDMA") uplinks.

BACKGROUND

Location-based services are services that are available to users based on the location of a user's computing device. Location-based services can provide services and information that are relevant to a user at a particular location. Example location-based services include navigation services, social networking services, location-based advertising, tracking systems, ride sharing, gaming, and assistive healthcare systems. Location-based services rely on accurate computing device location information.

In wireless network deployments prior to Wi-Fi 6 and Wi-Fi 7 deployments, an access point within the wireless network dedicates the access point's bandwidth to a single device. In a scenario where multiple devices are in communication with the access point, transmissions from the devices occur in series. Neighboring access points within the wireless network can observe transmissions from a single device, identify the device, and determine a location of the device.

In Wi-Fi 6 and Wi-Fi 7 wireless network deployments, access points are configured for multi-user, multiple input, multiple output, and orthogonal frequency-division multiple access ("OFDMA") transmissions. OFDMA multiplexing is a method of data transmission where a single information stream is split among several closely spaced, narrowband subchannel frequencies, also referred to as resource units, instead of a single wideband channel frequency. As OFDMA multiplexing enables parallel transmissions from multiple devices simultaneously, neighboring access points are unable to map an OFDMA uplink to the different computing devices to determine the location of the computing devices.

DETAILED DESCRIPTION

Overview

The present technology enables determining the location of client devices via radio scanning for triggered orthogonal frequency-division multiple access ("OFDMA") uplinks. In Wi-Fi 6 and Wi-Fi 7 wireless network deployments, access points are configured for multi-user, multiple input, multiple output, and OFDMA transmissions. As OFDMA multiplexing enables parallel transmissions from multiple devices simultaneously, access points within the wireless network are unable to map an OFDMA uplink to different client devices to determine the location of the client devices. Accurate client device location is necessary for applications providing location-based services.

In an example embodiment, a first access point transmits a trigger frame on a particular channel to client devices, or stations, connected to the first access point. The trigger frame is a component of an OFDMA transmission in accordance with IEEE 802.11ax standards. The trigger frame is a downlink transmission from the first access point to each of the stations connected the first access point. The trigger frame is used to allocate resources for a subsequent multi-user OFDMA uplink transmission. The stations receive the trigger frame and determine a resource unit allocation for a subsequent multi-user OFDMA uplink transmission. In response to receiving the trigger frame, the stations transmit a multi-user OFDMA uplink to the first access point. The first access point receives the OFDMA uplink transmission from the stations. The process of sending trigger frames and receiving OFDMA uplinks is repeated in accordance with IEEE 802.11ax standards.

Occurring concurrently with the trigger frame and OFDMA uplink transmissions, neighboring access points scan for trigger frames. The neighboring access points perform a scan of the different channels in use in the wireless network for trigger frames. Upon detection of a trigger frame, the neighboring access points decode the trigger frame by associating a station identifier with each resource unit, determining a frequency allocation for each resource unit, and storing the associated station identifier and frequency allocation. The neighboring access points then receive the OFDMA uplink from the stations. As the neighboring access points have previously stored the associated station identifier and frequency allocation, the neighboring access points are able to determine which station identifier is transmitting on each frequency allocation.

The neighboring access points determine a received signal strength indicator value for each resource unit in the OFDMA uplink. The neighboring access points may be configured to determine a received signal strength indicator value or the neighboring access points may determine a received signal strength indicator value by performing a fast Fourier Transform capture.

The neighboring access points then transmit the received signal strength indicator values for each resource unit with the associated station identifier to the first access point. The first access point determines the location of each station. The first access point matches the station identifier for each resource unit to a MAC address. The first access point then maps each received signal strength indicator per resource unit to a distance value. The first access point determines a location of each station using the distance values and the locations of the neighboring access points by triangulation.

After the determination of the location station, the first access point may transmit the location information to a server for location-based services. In an alternate example, the first access point may transmit the received signal strength indicator values for each MAC address to a server for station location calculations.

The present technology allows for determining the location of client devices via radio scanning for triggered orthogonal frequency-division multiple access ("OFDMA") uplinks. In Wi-Fi 6 and Wi-Fi 7 wireless network deployments, access points within the wireless network are unable to map OFDMA uplinks to different client devices to determine the location of the client devices. Accurate client device location is necessary for applications such as location-based services. The present technology provides embodiments to determine client device locations in Wi-Fi 6 and Wi-Fi wireless networks.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

Figure 1:
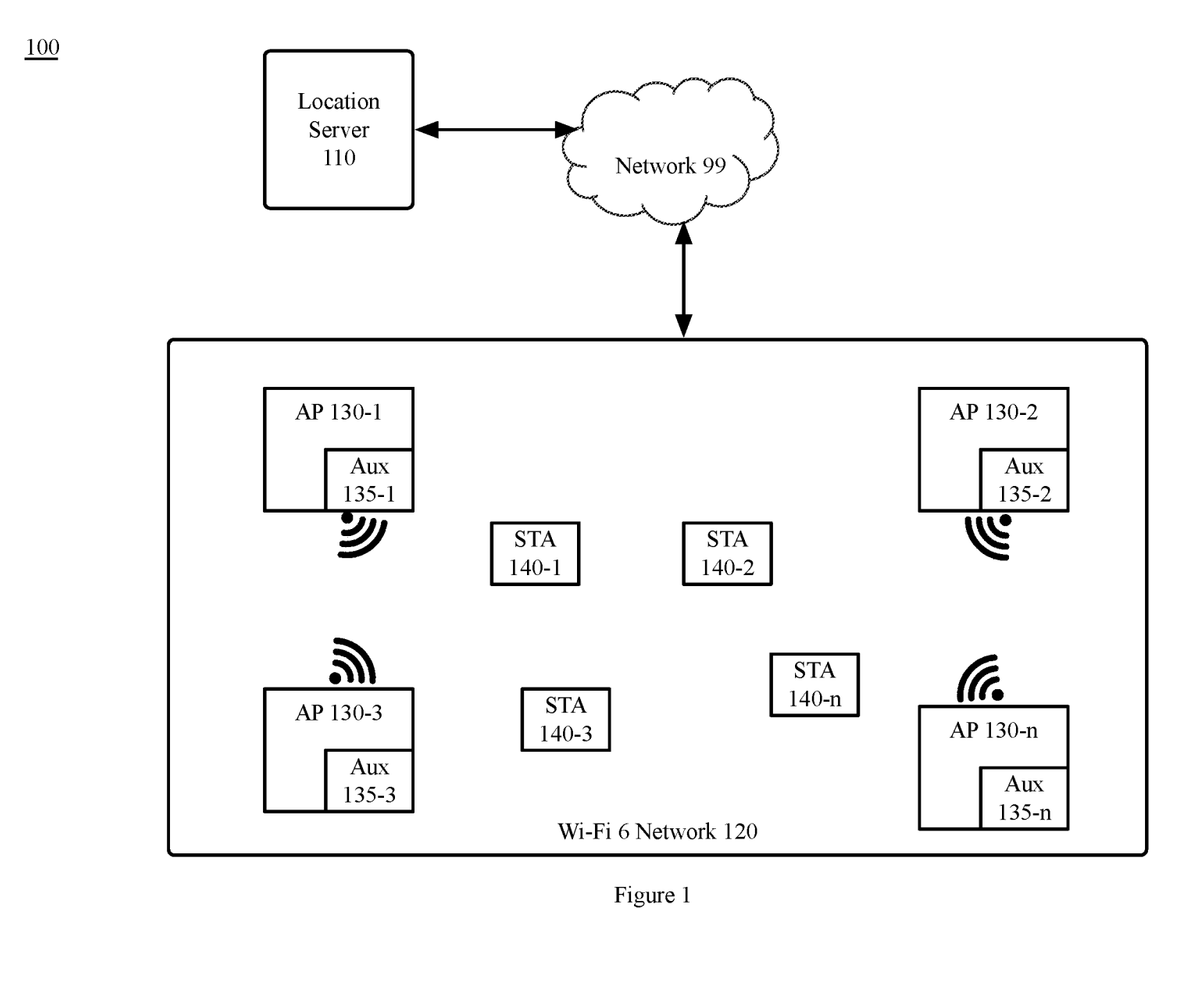
FIG. 1 is a block diagram depicting a wireless station location system for Wi-Fi 6 network configurations, in accordance with certain examples.

FIG. 1 is a block diagram depicting a wireless station location system 100 for Wi-Fi 6 network configurations, in accordance with certain examples. As depicted in FIG. 1, the wireless station location system 100 comprises network 99, location server 110, and Wi-Fi 6 network 120.

In example embodiments, network 99 includes one or more wired or wireless telecommunications systems by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Wireless station location system 100 comprises location server 110. In an example, location server 110 is a server in communication with Wi-Fi 6 network 120 via network 99. While FIG. 1 illustrates a single location server 110, wireless station location system 100 may comprise multiple location servers 110. In an example, location server 110 comprises one or more computing devices and executes applications and/or computer executable code to determine the location of stations 140 within Wi-Fi 6 network 120.

Wi-Fi 6 network 120 is a wireless local area network ("WLAN") that functions in accordance with the IEEE 802.11ax standard. Wi-Fi 6 network 120 supports Wi-Fi 6 functionality including multi-user, multiple input, multiple output ("MU-MIMO") and orthogonal frequency-division multiple access ("OFDMA") transmissions. OFDMA multiplexing is a method of data transmission where a single information stream is split among several closely spaced narrowband subchannel frequencies, also referred to as resource units ("RUs"), instead of a single wideband channel frequency.

Wi-Fi 6 network 120 comprises access points ("APs") 130-1 through 130-$n$ and stations ("STAs") 140-1 through 140-$n$. APs 130 function to transmit and receive wireless (i.e., Wi-Fi) signals to and from devices within Wi-Fi 6 network 120, such as STAs 140. APs 130 support Wi-Fi 6 functionality including MU-MIMO and OFDMA transmissions. While APs 130-1 through 130-$n$ are depicted as similar devices in FIG. 1, each AP 130 may be one of numerous different types of network hardware devices. Each AP 130 comprises one or more auxiliary radios and/or service channels for transmitting and receiving wireless signals. Each radio may have an internal antenna or both an internal and external antenna. The IEEE 802.11 standard designates the radio frequencies used by each AP 130. Each AP 130 may connect to a router (not depicted in FIG. 1) or may be a component of the router itself.

Each AP 130 comprises one or more auxiliary radios ("AUX") 135. Each AUX 135 is associated with a service channel for transmitting and receiving wireless signals. In an example, each AUX 135 is associated with a service channel for transmissions to STAs 140.

Each AP 130 may comprise a location mapping stored in a memory of each of the APs 130 within Wi-Fi 6 network 120. In an example, the location mapping of each of the APs 130 allows each AP 130 to triangulate distance values for STAs 140 to determine the location of STAs 140.

Wi-Fi 6 network 120 comprises one or more STAs 140. STAs 140 are computing devices capable of receiving and transmitting wireless signals. STA 140 may also be referred to as a wireless client, a client device, or a node. In an example, STAs 140 are devices with the capability to use the IEEE 802.11 protocol for wireless network communications. Each STA 140 can be a laptop, a desktop, a personal digital assistant ("PDA"), a Wi-Fi phone, an automated guided vehicle ("AGV"), an autonomous mobile robot ("AMR"), augmented reality ("AR") or virtual reality ("VR") headsets, Internet of things ("IoT") devices, or any other devices with wireless communication capabilities. Each STA 140 can be fixed, mobile, or portable.

Figure 2:
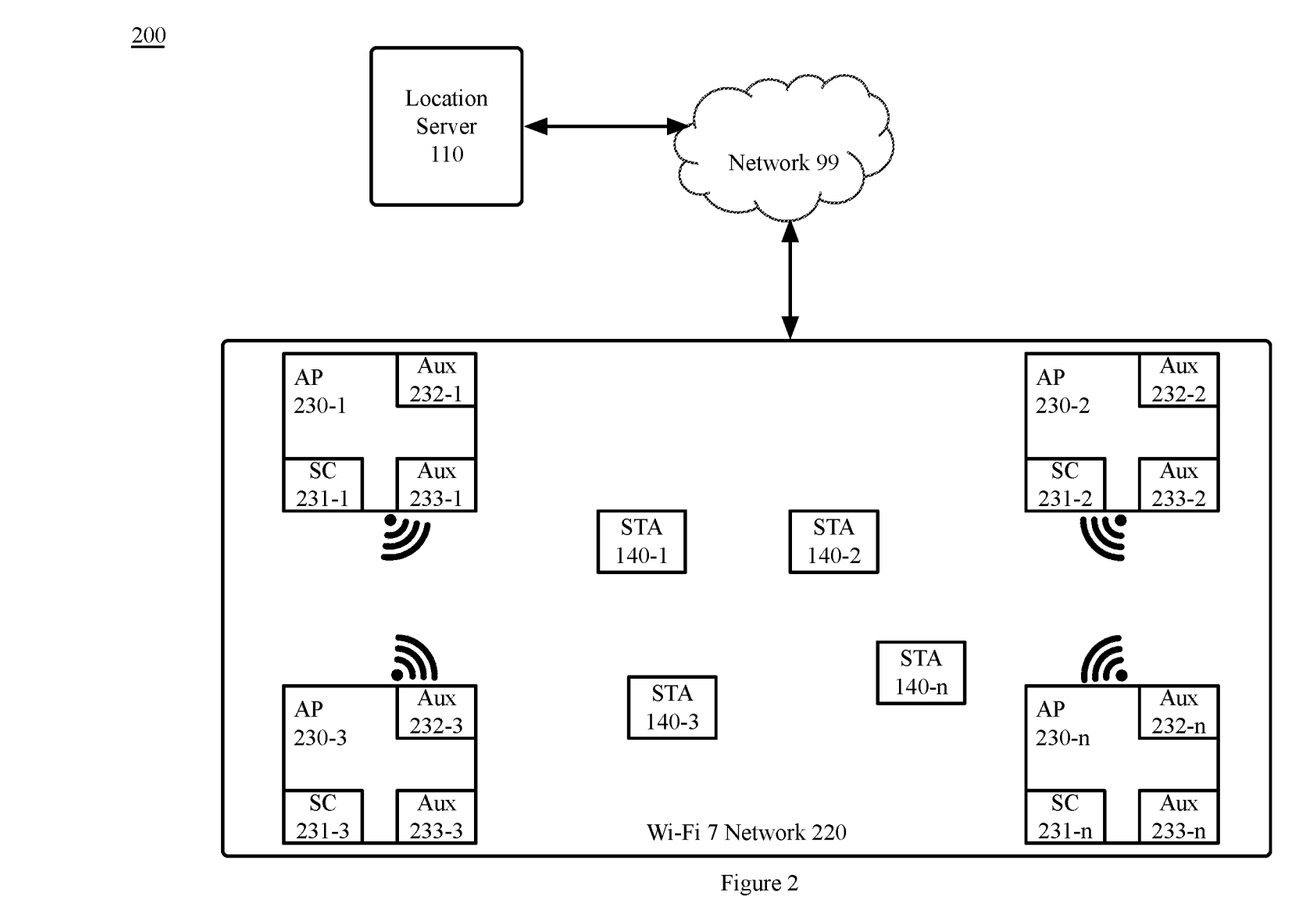
FIG. 2 is a block diagram depicting a wireless station location system for Wi-Fi 7 network configurations, in accordance with certain examples.

FIG. 2 is a block diagram depicting a wireless station location system 200 for Wi-Fi 7 network configurations, in accordance with certain examples. As depicted in FIG. 2, the wireless station location system 200 comprises network 99, location server 110, and Wi-Fi 7 network 220. Network 99 and location server 110 were previously described herein with reference to FIG. 1.

In an example, location server 110 is a server in communication with Wi-Fi 7 network 220 via network 99. While FIG. 2 illustrates a single location server 110, wireless station location system 200 may comprise multiple location servers 110. In an example, location server 110 comprises one or more computing devices and executes applications and/or computer executable code to determine the location of STAs 140 within Wi-Fi 7 network 220.

Wi-Fi 7 network 220 is a wireless local area network ("WLAN") that functions in accordance with the IEEE 802.11bc standard. Wi-Fi 7 network 220 supports Wi-Fi 7 functionality including MU-MIMO and OFDMA transmissions, as previously described herein with reference to Wi-Fi 6 network 120. In addition, Wi-Fi 7 network 220 supports Multi-Link Operation ("MLO"), Multi-Access Point coordination, and scheduled channel access with 802.1 time sensitive networking ("TSN") functionality.

Wi-Fi 7 network 220 comprises APs 230-1 through 230-n and STAs 140-1 through 140-n. APs 230 function to transmit and receive wireless (i.e., Wi-Fi) signals to and from devices within Wi-Fi 7 network 220, such as STAs 140. APs 230 support Wi-Fi 7 functionality including MU-MIMO, OFDMA, MLO, and multi-channel operation. MLO enables APs 230 to simultaneously transmit and receive across different bands and channels. While APs 230-1 through 230-n are depicted as similar devices in FIG. 2, each AP 230 may be one of numerous different types of network hardware devices. Each AP 230 comprises one or more auxiliary radios and/or service channels for transmitting and receiving wireless signals. Each radio may have an internal antenna or both an internal and external antenna. The IEEE 802.11 standard designates the radio frequencies used by each AP 230. Each AP 230 may connect to a router (not depicted in FIG. 2) or may be a component of the router itself.

Each AP 230 comprises a service channel ("SC") 231, and two or more auxiliary radios ("AUX") 232 and 233. Each AUX 232 and 233 has MLO capabilities. Each SC 231 is a channel within the Wi-Fi 7 320 MHz bandwidth for AP 230 to send and receive wireless transmissions within W-Fi 7 network 220. Each AUX 232 and 233 has MLO functionality.

Each AP 230 may comprise a location mapping stored in a memory of each of the APs 230 within Wi-Fi 7 network 220. In an example, the location mapping of each of the APs 230 allows each AP 230 to triangulate distance values for STAs 140 to determine the location of STAs 140.

Wi-Fi 7 network 220 comprises one or more STAs 140. STAs 140 were previously described herein with reference to FIG. 1.

Wireless station location system 100 and wireless station location system 200 may comprise other devices such as routers, switches, modems, repeaters, and antennae that are not depicted in FIG. 1 or FIG. 2.

Figure 7:
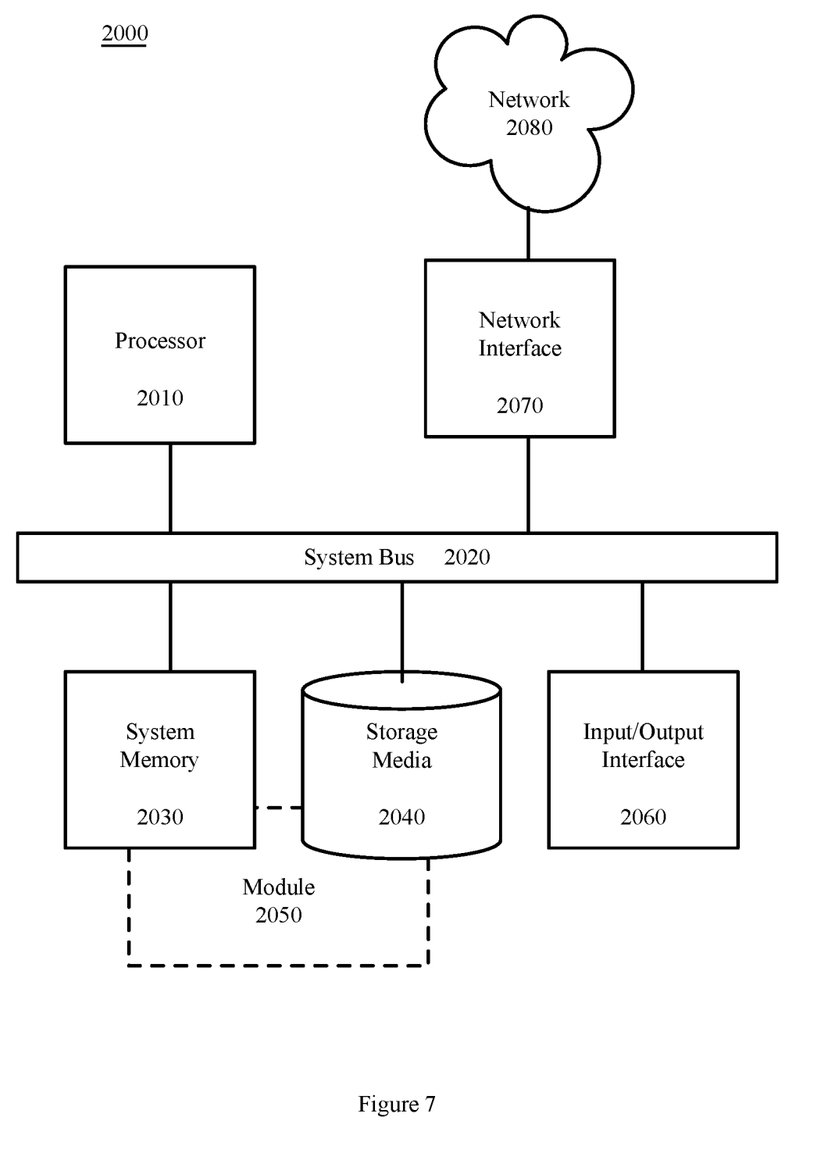
FIG. 7 is a block diagram depicting a computing machine and a module, in accordance with certain examples.

The network computing devices and any other computing machines associated with the technology presented herein may be any type of computing machine, such as, but not limited to, those discussed in more detail with respect to FIG. 7. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks. Each network may include various types of data or communications networks, including any of the network technology discussed with respect to FIG. 7.

Furthermore, any modules associated with any of these computing machines, such as modules described herein or any other modules (scripts, web content, software, firmware, or hardware) associated with the technology presented herein may be any of the modules discussed in more detail with respect to FIG. 7.

The network connections illustrated are examples and other means of establishing a communications link between the computers and devices can be used. Moreover, those having ordinary skill in the art having the benefit of the present disclosure will appreciate that the devices illustrated in FIG. 1 and FIG. 2 may have any of several other suitable computer system configurations.

Example Processes

The methods illustrated in FIGS. 3 through 6 are described hereinafter with respect to the components of wireless station location systems 100 and 200. The methods of FIGS. 3 through 6 may also be performed with other systems and in other environments. The operations described with respect to FIGS. 3 through 6 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

The methods of FIGS. 3 through 6 describe determining the location of client devices, or stations, via radio scanning for triggered OFDMA uplinks. The methods of FIGS. 3 through 6 describe determining the location of client devices by a first AP as an example embodiment. The methods of FIGS. 3 through 6 can be performed concurrently and simultaneously by any of APs 130 or 230 of wireless station location systems 100 and 200. In a first example, the methods of FIGS. 3 through 6 are described herein in reference to wireless station location system 100.

Figure 3:
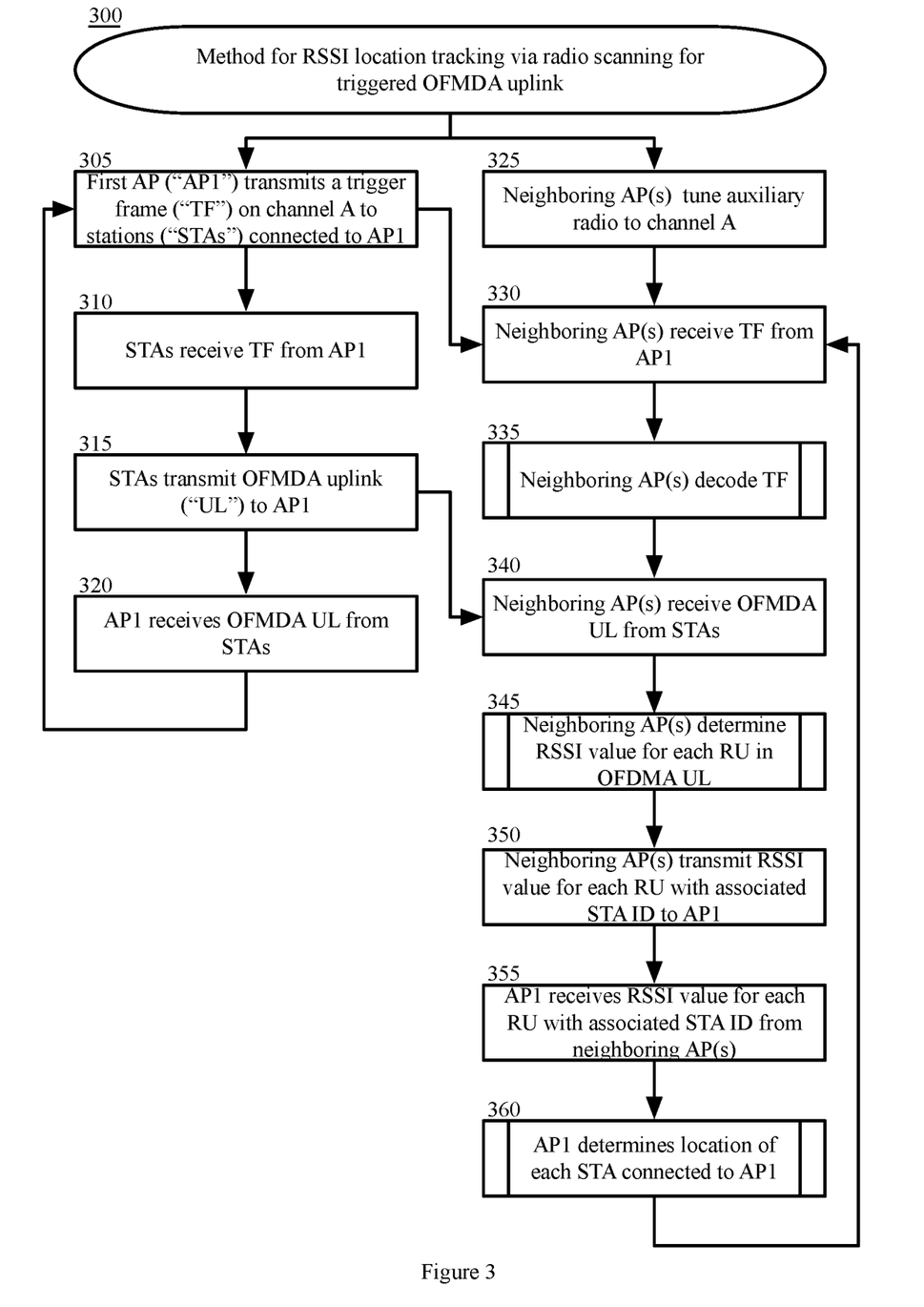
FIG. 3 is a block flow diagram depicting a method for receiving signal strength indicator location tracking via radio scanning for triggered orthogonal frequency-division multiple access uplink, in accordance with certain examples.

FIG. 3 is a block flow diagram depicting a method 300 for receiving signal strength indicator ("RSSI") location tracking via radio scanning for triggered OFDMA uplinks, in accordance with certain examples. Method 300 proceeds in parallel paths to block 305 and block 325.

Figure 8:
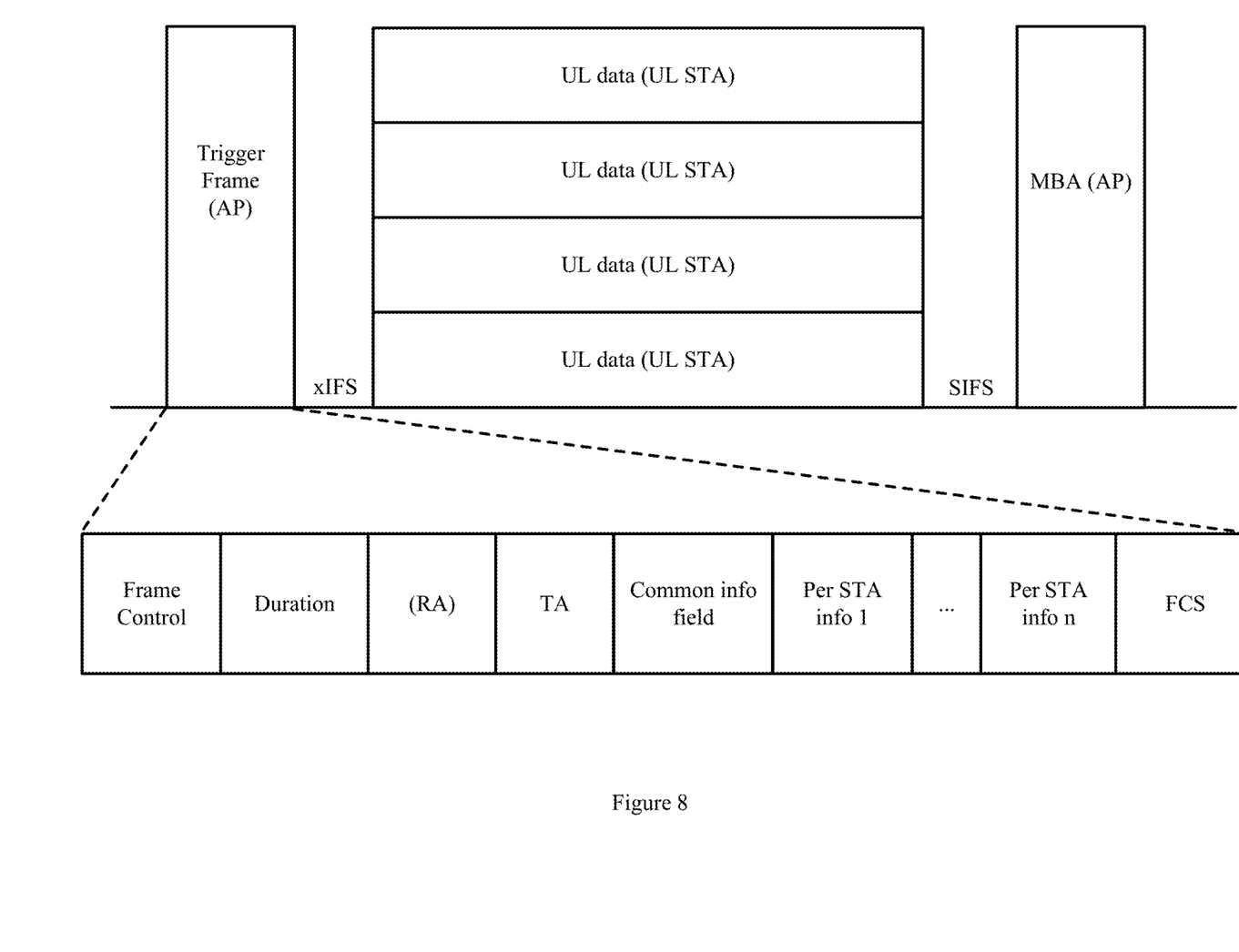
FIG. 8 is a block diagram depicting an example trigger frame, in accordance with certain examples.

In block 305, a first AP 130 transmits a trigger frame on channel A to STAs 140 connected to first AP 130. In a continuing example, the first AP 130 is AP 130-1. In an example, channel A is a designated channel for AP 130-1 to send and receive wireless transmissions. The trigger frame is a component of an OFDMA transmission in accordance with IEEE 802.11ax standards. An example trigger frame is depicted in FIG. 8.

The trigger frame is a downlink transmission from AP 130-1 to each of the STAs 140 connected to, or in communication with, AP 130-1. The trigger frame may be used to allocate resources for a subsequent multi-user OFDMA uplink ("UL") transmission. In an example, the trigger frame comprises an abbreviated station identifier ("STA ID") for each STA 140 intended to receive the trigger frame transmission. The trigger frame also comprises an uplink frequency allocation, designated as a resource unit ("RU"), for each STA 140.

In block 310, STAs 140 receive the trigger frame from AP 130-1. Upon receipt of the trigger frame, each STA 140 determines the RU allocation for a subsequent multi-user OFDMA UL transmission.

In block 315, STAs 140 transmit an OFDMA UL to AP 130-1. STAs 140 transmit the OFDMA UL simultaneously as a multi-user OFDMA UL transmission. In an example, the multi-user OFDMA UL transmission occurs at a designated period of time after the transmission of the trigger frame. In an example, the multi-user OFDMA UL transmission occurs 16 μs after the transmission the trigger frame.

In block 320, AP 130-1 receives the OFDMA UL transmission from STAs 140. From block 320, the method 300 returns to blocks 305 and 325, as part of the parallel paths of method 300.

In block 325, neighboring AP(s) 130 tune AUX 135 to channel A. In an example, neighboring APs 130 are APs 130-2 through 130-n within Wi-Fi 6 network 120. Each AP 130-2 through 130-n has a designated channel, other than channel A, to send and receive wireless transmissions. Each AP 130-2 through 130-*n* tunes an associated AUX 135-2 through 135-*n* to match the designated channel for AP 130-1, i.e., channel A. APs 130-2 through 130-*n* tune the associated AUX 135-2 through 135-*n* to channel A to monitor for trigger frames and subsequent OFDMA UL transmissions. In an example, APs 130 scan for trigger frame transmissions from other APs 130 by tuning each AUX 135 to channels that match other APs 130. In an example, AP 130-2 would scan channel A associated with AP 130-1, then channel C associated with AP 130-3, then the other channels associated with the other APs 130 for trigger frame transmissions.

In block 330, neighboring APs 130-2 through 130-*n* receive the trigger frame from AP 130-1.

In block 335, neighboring APs 130-2 through 130-*n* decode the trigger frame. Block 335 is described in greater detail here with reference to method 335 of FIG. 4.

Figure 4:
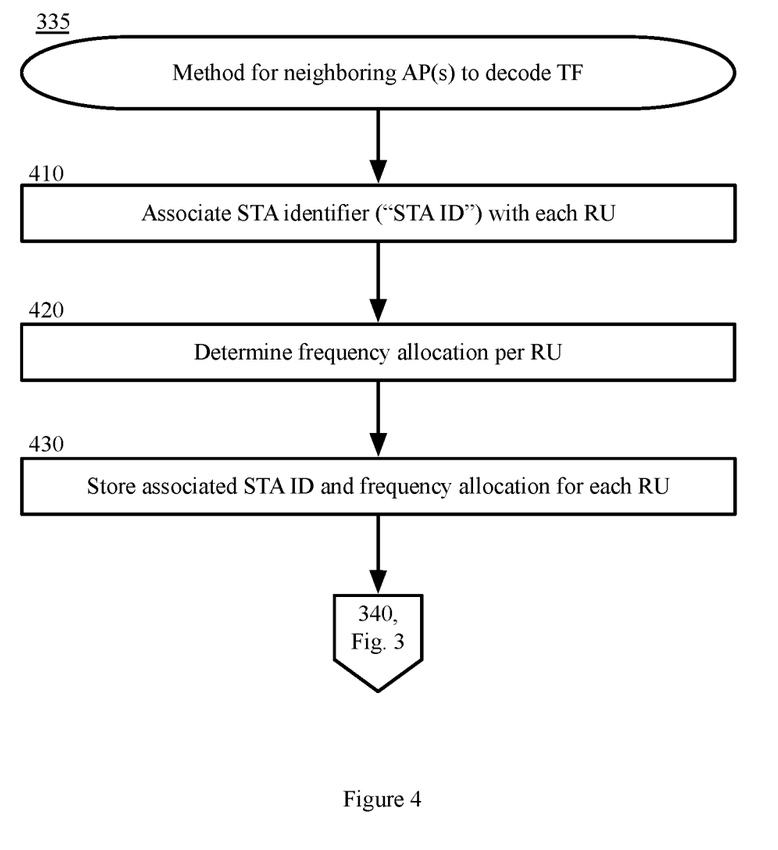
FIG. 4 is a block flow diagram depicting a method for neighboring access points to decode a trigger frame, in accordance with certain examples.

FIG. 4 is a block flow diagram depicting a method 335 for neighboring APs 130-2 through 130-*n* to decode a trigger frame, in accordance with certain examples.

In block 410, each neighboring AP 130-2 through 130-*n* associates a STA identifier ("STA ID") with each RU in the trigger frame. As previously described herein, the trigger frame comprises a STA ID for each STA 140 intended to receive the downlink transmission and an uplink frequency allocation, designated as a resource unit ("RU").

In block 420, each neighboring AP 130-2 through 130-*n* determines a frequency allocation for each RU. In an example, STA 140-1 may be designated a particular RU. The trigger frame comprises an uplink frequency allocation associated with each RU.

In block 430, each neighboring AP 130-2 through 130-*n* stores the associated STA ID and frequency allocation for each RU. From block 430, the method 335 returns to block 340 of FIG. 3.

In block 340, neighboring APs 130-2 through 130-*n* receive the OFDMA UL from STAs 140. As previously described herein with reference to block 315 of FIG. 3, STAs 140 transmit the OFDMA UL simultaneously as a multi-user OFDMA UL transmission. As neighboring APs 130-2 through 130-*n* have previously stored the associated STA ID and frequency allocation for each RU, neighboring APs 130-2 through 130-*n* are able to determine which STA ID is transmitting on each frequency allocation.

In block 345, neighboring APs 130-2 through 130-*n* determine an RSSI value for each RU in the OFDMA UL. Block 345 is described in greater detail herein with reference to method 345 of FIG. 5.

Figure 5:
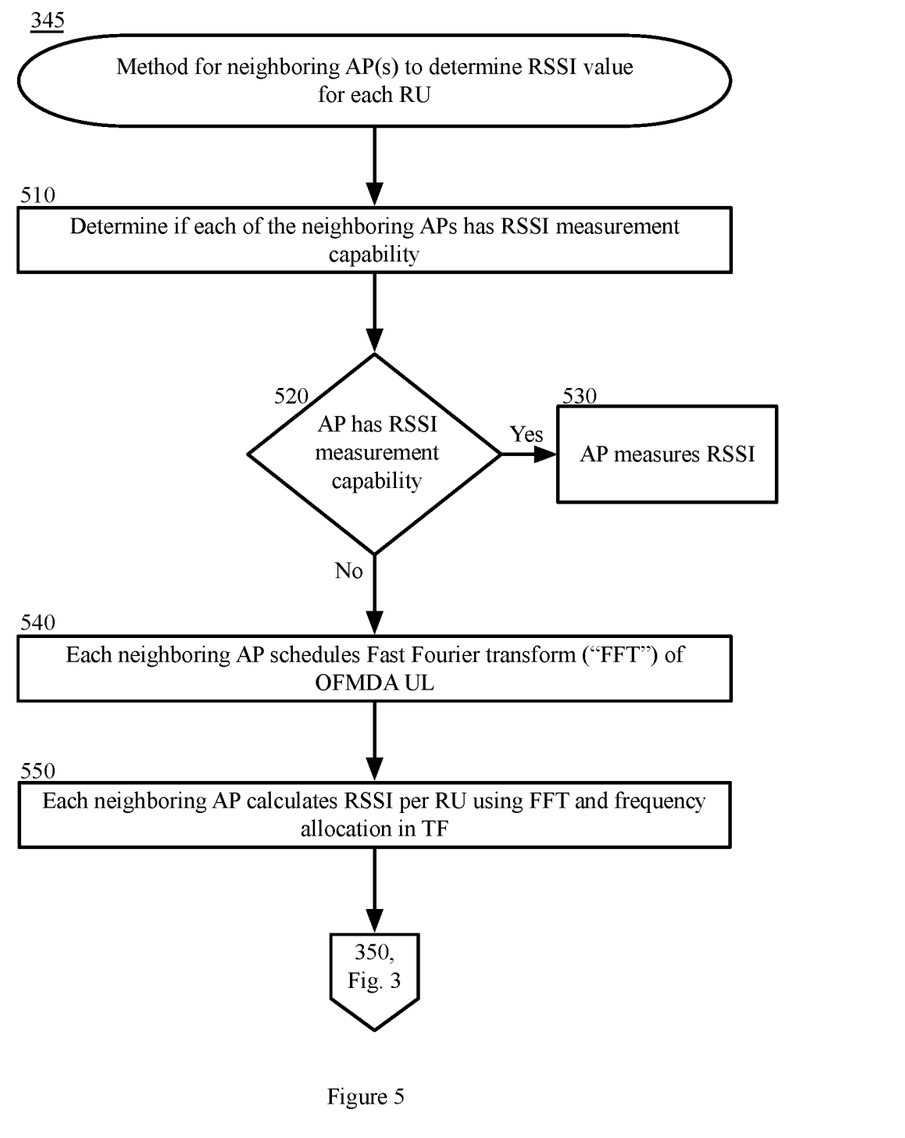
FIG. 5 is a block flow diagram depicting a method for neighboring access points to determine a receiving signal strength indicator value for each resource unit, in accordance with certain examples.

FIG. 5 is a block flow diagram depicting a method 345 for neighboring APs 130-2 through 130-*n* to determine an RSSI value for each RU, in accordance with certain examples.

In block 510, a determination is made if each of the neighboring APs 130-2 through 130-*n* has RSSI measurement capability. In an example, location server 110 has the capability to determine the functionality of each of the APs 130 within wireless station location system 100. In an alternate example, a wireless network controller, not depicted in FIG. 1 or FIG. 2, has the capability to determine the functionality of each of the APs 130 within wireless station location system 100. In another example, a network operator determines the functionality of each of the APs 130 within wireless station location system 100. Any suitable method may be used to determine if each of the neighboring APs 130-2 through 130-*n* has RSSI measurement capability.

In block 520, for each AP 130 with RSSI measurement capability, the method proceeds to block 530. In block 530, each AP 130 with RSSI measurement capability measures the RSSI value for each RU in the OFDMA UL.

Returning to block 520, for each AP 130 without RSSI measurement capability, the method proceeds to block 540. In block 540, each neighboring AP 130-2 through 130-*n* without RSSI measurement capability schedules a Fast Fourier transform ("FFT") of the OFDMA UL per RU for RSSI calculation. Based on the transmission of the trigger frame, each neighboring AP 130-2 through 130-*n* without RSSI measurement capability knows the timing of the OFDMA UL. As previously described herein with reference to block 315 of FIG. 3, the multi-user OFDMA UL transmission occurs at a designated period of time after the transmission of the trigger frame. For example, the multi-user OFDMA UL transmission occurs 16 μs after the transmission of the trigger frame. Each neighboring AP 130-2 through 130-*n* schedules a FFT capture to start 16 μs after the transmission of the trigger frame. In an example, a spectral scan of the OFDMA UL is scheduled at designated time periods beginning 16 μs after the transmission of the trigger frame. The spectral scan may be scheduled to occur every 1 μs, 2 μs, 3 μs, or any other suitable time period. The spectral scan may be used to provide sufficient snapshots of data in the time domain for the FFT capture. In an example, if the spectral scan is scheduled to occur every 3 μs, the FFT is performed every 3 μs for each RU in the OFDMA UL independently. In an alternate example, a continuous spectral scan is scheduled to occur 16 μs after the transmission of the trigger frame.

In block 550, each neighboring AP 130-2 through 130-*n*, without RSSI measurement capability, calculates an RSSI per RU using the FFT and frequency allocation in the trigger frame. In an example, the FFT captures in-phase data, $I_i$, and Quadrature data, $Q_i$. In an example, the RSSI value for each RU may be calculated using the following equation:

$$RSSI_i = 10*\log_{10}(\frac{1}{n}\sum_{1}^{n}(I_i^2 + Q_i^2)),$$

example, the RSSI value may be adjusted for each RU based on a noise and a signal-to-noise ("SNR") ratio. From block 550, the method 345 returns to block 350 of FIG. 3.

In block 350, each neighboring AP 130-2 through 130-*n* transmits the RSSI value for each RU with the associate STA ID to AP 130-1. In an example, each neighboring AP 130-2 through 130-*n* retrieves the stored STA ID for each RU and transmits the STA ID with the associated RSSI value to AP 130-1.

In block 355, AP 130-1 receives the RSSI value for each RU with the associated STA ID from each of the neighboring APs 130-2 through 130-*n*.

In block 360, AP 130-1 determines the location of each STA 140 connected to AP 130-1. Block 360 is described in greater detail herein with reference to method 360 of FIG. 6.

Figure 6:
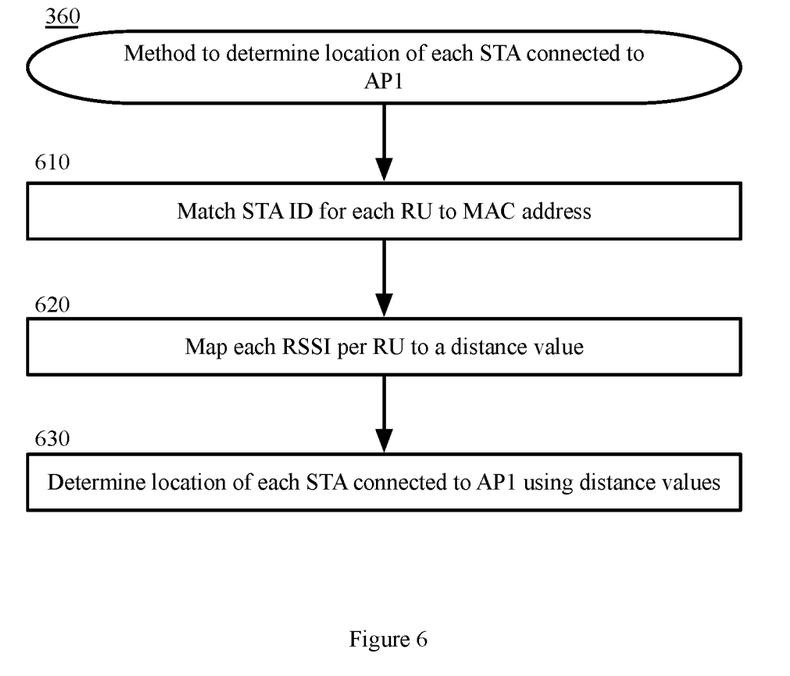
FIG. 6 is a block flow diagram depicting a method to determine a location of each station connected to a first access point, in accordance with certain examples.

FIG. 6 is a block flow diagram depicting a method 360 to determine a location of each STA 140 connected to AP 130-1, in accordance with certain examples.

In block 610, AP 130-1 matches the STA ID for each RU to a MAC address for each STA 140.

In block 620, AP 130-1 maps each RSSI per RU to a distance value. AP 130-1 has received an RSSI value for each STA 140 from each neighboring AP 130-2 through 130-*n*. AP 130-1 determines a distance value for each received RSSI value for each STA 140. In an example, a distance value may be determined using a regression model against a known table of distance/RSSI values for specific APs 130 and STAs 140, the RSSI values, and the measured power ("MP") for AP 130-1. The measured power value is a constant for each AP 130 that indicates the expected RSSI value at a distance of 1 meter from the AP 130. In the example, the distance may be calculated using the following equation:

$$\text{distance} = A * \left(\frac{RSSI}{MP}\right)^B + C,$$

wherein A, B, and C are constants determined by the regression model. In an alternate example, a distance value can be determined for each RSSI per RU using the MP, the RSSI value, and a constant, N, based on environmental factors within wireless station location system 100. In an example, the distance is calculated using the following equation:

$$\text{distance} = 10 * \left(\frac{MP - RSSI}{10 * N}\right).$$

Any other suitable method to calculate or map the RSSI values for each RU to a distance value may be used.

In block 630, AP 130-1 determines a location of each STA 140 connected to AP 130-1 using distance values from block 625. As previously described herein with reference to FIG. 1, AP 130-1 comprises a location mapping of each AP 130 within Wi-Fi 6 network 120. In an example, AP 130-1 determines the location of each STA 140 using a triangulation process. AP 130-1 knows the location of each neighboring AP 130-2 through 130-$n$ and the distance value from each neighboring AP 130-2 through 130-$n$ to each STA 140. AP 130-1 determines the location of each STA 140 by triangulating the distance values from the neighboring APs 130-2 through 130-$n$ and the known location of each neighboring AP 130-2 through 130-$n$.

After the determination of the location of each STA 140, AP 130-1 may transmit the location information for each STA 140 by MAC address to location server 110. Location server 110 may use the location information for each STA 140 for location-based services related to each STA 140. Example location-based services include, but are not limited to, navigation software, social networking services, location-based advertising, tracking systems, ride sharing, gaming, and assistive healthcare systems. In an alternate example, AP 130-1 may transmit the location information for each STA 140 by MAC address to a server for location-based services other than location server 110.

In an alternate example, method 360 of FIG. 6 may be performed by location server 110. AP 130-1 may match the STA ID for each RU to a MAC address for each STA 140 as described in block 610. Subsequently, AP 130-1 may transmit the received RSSI values for each RU with the associated MAC address to location server 110 to determine the location of each STA 140 connected to AP 130-1.

The methods of FIGS. 3 through 6 can also be performed in a Wi-Fi 7 configuration as described herein with reference to wireless station location system 200 of FIG. 2. In a Wi-Fi 7 configuration, the first AP 230, in this example AP 230-1, can transmit a buffer status report poll ("BSRP") to neighboring APs 230-2 through 230-$n$. The BSRP is a transmission that indicates that an OFDMA UL is going to occur. Neighboring APs 230-2 through 230-$n$ can tune AUX 232 or AUX 233 to the transmission channel associated with the BSRP without scanning other channels for trigger frames.

In addition to BSRP capability, Wi-Fi 7 supports MLO operation. When AP 230-1 transmits a BSRP, an AUX 232 or 233 of a neighboring AP 230-2 through 230-$n$ may observe the BSRP and send a signal on a shared MLO channel (via AUX 232 or 233) to the other neighboring APs 230-2 through 230-$n$. The other neighboring APs 230-2 through 230-$n$ receive the signal on AUX 232 or 233 that a BSRP has occurred and on which channel. Neighboring APs 230-2 through 230-$n$ can receive the OFDMA UL on either AUX 232 or 233 without changing the service channel 231 to match the service channel 231 of AP 230-1.

Other Examples

FIG. 7 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
   by a first computing device in a wireless network:
   transmitting a frame over the wireless network to one or more stations, the frame being a trigger frame to coordinate resource allocation among the one or more stations;
   receiving, from one or more second computing devices in the wireless network, a received signal strength indicator value with an associated identifier for each of the one or more stations, the received signal strength indicator value and associated identifier being determined by the one or more second computing devices at least partly by detecting the frame that was transmitted to the one or more stations;
   matching the associated identifier to a respective address for each of the one or more stations;
   determining a distance value from the received signal strength indicator value for each of the one or more stations;
   determining a location of each of the one or more stations using the distance values; and
   transmitting, to one or more third computing devices, the location and the respective address of each of the one or more stations.

2. The method of claim 1, comprising:
   by the one or more second computing devices:
   scanning transmission channels in the wireless network for frame transmissions;
   receiving, on a channel associated with the first computing device, the frame;
   associating, for each of the one or more stations, an identifier with a frequency allocation;
   receiving, from each of the one or more stations, a second frame;
   determining, from each second frame, the received signal strength indicator value for each frequency allocation; and
   transmitting, to the first computing device, the received signal strength indicator value with the associated identifier for each frequency allocation.

3. The method of claim 2, wherein the second frames are orthogonal frequency-division multiple access ("OFDMA") uplinks.

4. The method of claim 2, wherein the received signal strength indicator value for each frequency allocation is determined using a Fast Fourier transform.

5. The method of claim 1, wherein the frame is a trigger frame.

6. The method of claim 1, wherein determining the location of each of the one or more stations comprises triangulating the distance values with a location of each of the one or more second computing devices.

7. The method of claim 1, wherein determining the distance value from the received signal strength indicator value for each of the one or more stations comprises using a regression model.

8. The method of claim 1, wherein the wireless network is a Wi-Fi 6 network.

9. The method of claim 1, wherein the wireless network is a Wi-Fi 7 network.

10. A computer program product, comprising:
    a non-transitory computer-readable medium having computer-readable program instructions embodied thereon that, when executed by a first computing device, cause the first computing device to:
    transmit a frame over a wireless network to one or more stations, the frame being a trigger frame to coordinate resource allocation among the one or more stations;
    receive, from one or more second computing devices in the wireless network, a received signal strength indicator value with an associated identifier for each of the one or more stations, the received signal strength indicator value and associated identifier being determined by the one or more second computing devices at least partly by detecting the frame that was transmitted to the one or more stations;
    match the associated identifier to a respective address for each of the one or more stations;
    determine a distance value from the received signal strength indicator value for each of the one or more stations;
    determine a location of each of the one or more stations using the distance values; and
    transmit, to one or more third computing devices, the location and the respective address of each of the one or more stations.

11. The computer program product of claim 10, wherein the frame is a trigger frame.

12. The computer program product of claim 10, wherein determining the location of each of the one or more stations comprises triangulating the distance values with a location of each of the one or more second computing devices.

13. The computer program product of claim 10, wherein determining the distance value from the received signal strength indicator value for each of the one or more stations comprises using a regression model.

14. The computer program product of claim 10, wherein the wireless network is a Wi-Fi 6 network.

15. The computer program product of claim 10, wherein the wireless network is a Wi-Fi 7 network.

16. A system, comprising:
a storage device; and
a processor communicatively coupled to the storage device, wherein the processor executes application code instructions that are stored in the storage device to cause the system to:
transmit a frame over a wireless network to one or more stations, the frame being a trigger frame to coordinate resource allocation among the one or more stations;
receive, from one or more second computing devices in the wireless network, a received signal strength indicator value with an associated identifier for each of the one or more stations, the received signal strength indicator value and associated identifier being determined by the one or more second computing devices at least partly by detecting the frame that was transmitted to the one or more stations;
match the associated identifier to a respective address for each of the one or more stations;
determine a distance value from the received signal strength indicator value for each of the one or more stations;
determine a location of each of the one or more stations using the distance values; and
transmit, to one or more third computing devices, the location and the respective address of each of the one or more stations.

17. The system of claim 16, wherein the frame is a trigger frame.

18. The system of claim 16, wherein determining the location of each of the one or more stations comprises triangulating the distance values with a location of each of the one or more second computing devices.

19. The system of claim 16, wherein the wireless network is a Wi-Fi 6 network.

20. The system of claim 16, wherein the wireless network is a Wi-Fi 7 network.

* * * * *